(12) United States Patent
Chan

(10) Patent No.: US 6,761,379 B1
(45) Date of Patent: Jul. 13, 2004

(54) PIPE FITTINGS

(75) Inventor: Alfred Wing Kin Chan, North Point (HK)

(73) Assignee: The Hong Kong and China Gas Company Limited, North Point (HK)

( * ) Notice: Subject to any disclaimer, the term of this patent is extended or adjusted under 35 U.S.C. 154(b) by 33 days.

(21) Appl. No.: 09/982,993

(22) Filed: Oct. 22, 2001

(51) Int. Cl.[7] ................................................ F16L 35/00
(52) U.S. Cl. .................................. 285/148.6; 285/148.7
(58) Field of Search ...................... 285/45, 179, 148.6, 285/148.7

(56) References Cited

U.S. PATENT DOCUMENTS

| | | | | |
|---|---|---|---|---|
| 220,407 A | * | 10/1879 | Mixer et al. .............. | 285/148.7 |
| 272,574 A | * | 2/1883 | Miles ....................... | 285/148.7 |
| 304,611 A | * | 9/1884 | Call ......................... | 285/148.6 |
| 342,305 A | * | 5/1886 | Nuttall ..................... | 285/291.1 |
| 364,666 A | * | 6/1887 | O'Leary ................... | 285/148.6 |
| 365,068 A | * | 6/1887 | Hendrick .................. | 285/148.6 |
| 437,019 A | * | 9/1890 | Clemens ....................... | 285/18 |
| 603,721 A | * | 5/1898 | Avery ....................... | 285/148.7 |
| 616,011 A | * | 12/1898 | Reich ....................... | 285/148.6 |
| 1,115,912 A | | 11/1914 | Dodson | |
| 2,053,807 A | * | 9/1936 | Wadsworth .............. | 285/148.7 |
| 2,062,145 A | | 11/1936 | Pickop | |
| 2,234,957 A | * | 3/1941 | Boynton ........................ | 285/3 |
| 2,239,942 A | | 4/1941 | Stone et al. | |
| 2,553,836 A | * | 5/1951 | Stone ......................... | 285/115 |
| 4,730,855 A | * | 3/1988 | Pelletier ..................... | 285/179 |

FOREIGN PATENT DOCUMENTS

| | | |
|---|---|---|
| DE | 89 13 648 | 2/1990 |
| HK | 1031171 | 5/2001 |
| JP | 58-149495 | 9/1983 |
| JP | 8-219339 | 8/1996 |
| WO | WO 96/03605 | 2/1996 |

\* cited by examiner

Primary Examiner—Eric K. Nicholson
(74) Attorney, Agent, or Firm—Leydig, Voit & Mayer, Ltd.

(57) ABSTRACT

A pipe fitting includes a hollow body and at least one open end for connection to a pipe fitting, the end including internal screw threads. The end includes an integral extension collar which has an inner diameter larger than the screw threads for surrounding unused trailing screw threads of a pipe joined to the fitting and forming an annular gap for holding a sealing compound. The collar has a wall of a comparable thickness to the and an outer diameter larger than the body of the fitting.

6 Claims, 2 Drawing Sheets

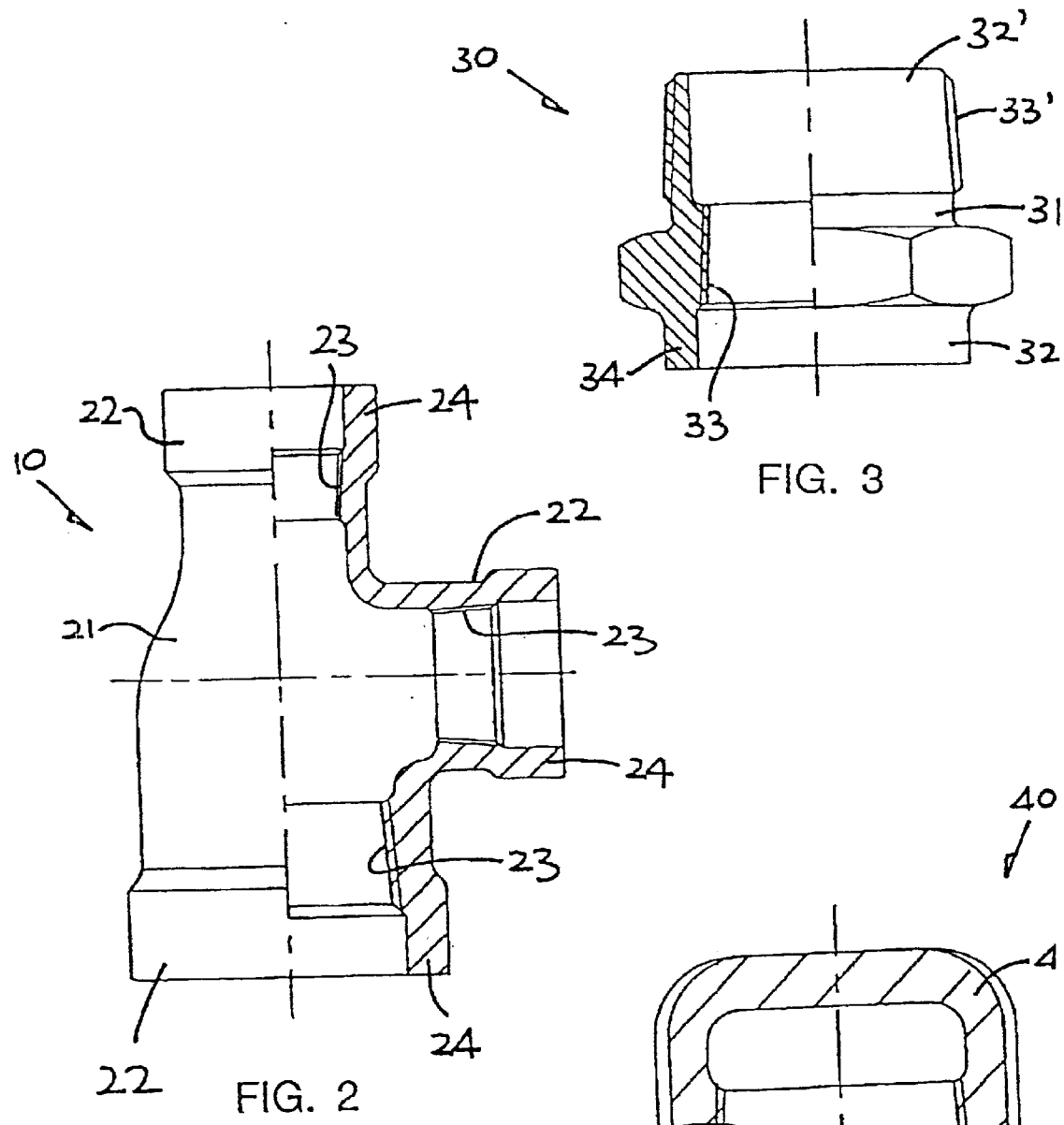
FIG. 3
FIG. 2
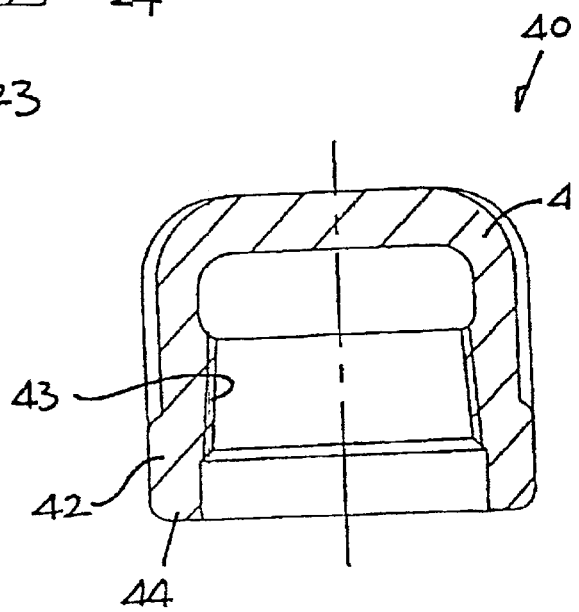
FIG. 4

PIPE FITTINGS

The present invention relates to pipe fittings for use in building pipe lines for delivering, particularly but not exclusively, cooking and heating gas.

BACKGROUND OF THE INVENTION

Pipe fittings are in abundant use for building pipe lines to deliver fluid from one location to another. They are available in a vast variety of forms and sizes for joining pipes together in different layouts. A typical low-cost material used for producing pipe fittings and pipes is iron, and the final products are usually galvanised with a coating of zinc or like for protecting the base material against rusting.

Pipes are cut with screw threads for joining purposes, whereby the base material at the joining positions is inevitably exposed. The base material adjacent to the joints upon completion may remain exposed, which would require protection. At present, paint is normally used for that purpose but is found to be unreliable.

The invention seeks to mitigate or at least alleviate such a problem by providing an improved pipe fitting.

SUMMARY OF THE INVENTION

According to the invention, there is provided a pipe fitting comprising a hollow body and at least one open end for connection to a pipe. This end is pre-formed with internal screw threads for connection and includes an integral extension collar. The collar has an inner diameter relatively larger than that of the screw threads for surrounding unused trailing screw threads of said pipe and forming an annular gap there between to hold a sealing compound. The collar has a wall of a comparable thickness as that of the end behind it and an outer diameter relatively larger than that of the end behind it.

In a preferred embodiment, the screw threads are slightly tapered outwards at a small angle with respect to the axis of the end.

It is preferred that for the pipe fitting to be made of a galvanised iron material.

The pipe fitting may be in the form selected from the group of an elbow joint, a T-shaped joint, a straight joint and a end cap.

BRIEF DESCRIPTION OF DRAWINGS

The invention will now be more particularly described, by way of example only, with reference to the accompanying drawings, in which:

FIG. 2 is a partial cross-sectional side view of a second embodiment of a pipe fitting in accordance with the invention;

FIG. 3 is a partial cross-sectional side view of a third embodiment of a pipe fitting in accordance with the invention; and FIG. 4 is a cross-sectional side view of a fourth embodiment of a pipe fitting in accordance with the invention.

DETAILED DESCRIPTION OF PREFERRED EMBODIMENTS

Figure 1:
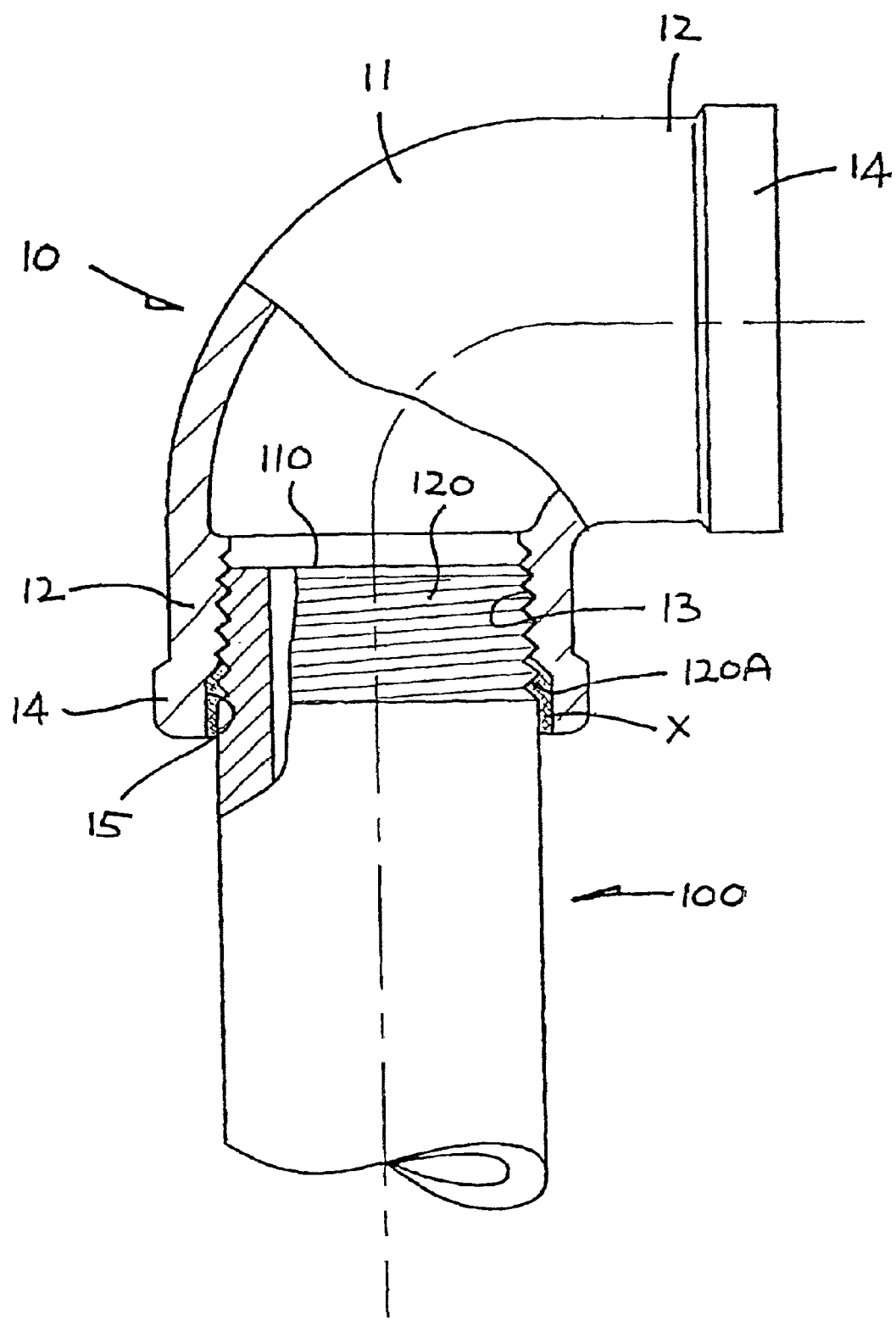
FIG. 1 is a partial cross-sectional side view of a first embodiment of a pipe fitting in accordance with the invention, which is joined to a pipe as shown.

Referring initially to FIG. 1 of the drawings, there is shown a first pipe fitting embodying the invention, which is in the form of a 90° elbow joint 10 shown in connection to a straight pipe 100. The pipe 100 includes one end 110 that is cut with external screw threads 120 for connection.

The elbow joint 10 has an arcuate hollow body 11 and two cylindrical open ends 12. Each end 12 is pre-formed with internal screw threads 13 and includes an integral extension collar 14 having an inner diameter relatively larger than that of the screw threads 13. The wall of the collar 14 has a comparable or substantially the same thickness, for strength, as that of the end 12 behind it. The outer diameter of the collar 14 is also relatively larger than that of the body of the end 12.

The joint 10 and the pipe 100 are connected together through inter-engagement between their threads 13 and 120. In order to achieve a connection that is as tight as possible, the threads 13 and 120 are slightly tapered outwards and inwards respectively, at a small angle of about 1° to 5° with respect to the central axes of the joint end 12 and pipe end 110, such that the pipe end 110 may be tightened into the joint end 12 through a wedge action. Accordingly, not all of the threads 120 will in practice engage with the threads 13, thereby leaving one or two turns, for example, of trailing threads 120A being unused and hence exposed. This will particularly be the case when the threads 120 are cut in situ, as there is a tendency or practice to cut the threads 120 slightly longer than the threads 13, by one or two turns for example.

The collar 14 is made sufficiently long to cover by surrounding the otherwise exposed trailing threads 120A of the pipe 100. An annular gap 15 is formed between the inner surface of the collar 14 and the outer surface of the pipe end 110, including the unused trailing threads 120A, which is completely filled with a sealing compound X.

The sealing compound X can easily be applied into collar 14, where it is held stably in the gap 15. Apart from sealing the joint, the compound X also protects the base material (iron) of the pipe 100 exposed at the unused threads 120A against rusting. As the unused threads 120A are concealed within the collar 14, the joint is given a tidier appearance.

FIG. 2 shows a second pipe fitting embodying the invention, which is in the form of a T-shaped joint 20 having a hollow body 21 and three open ends 22 of different diameters for connection to pipes. Each end 22 is pre-formed with internal screw threads 23 and includes an integral extension collar 24. The collars 24 have a very similar construction as the aforesaid collar 14 and are provided for the same function as described above.

FIG. 3 shows a third pipe fitting embodying the invention, which is in the form of a straight joint 30 having a hollow body 31 comprising opposite open ends 32 and 32' for connection. The first end 32 is formed with internal screw threads 33 and includes an integral extension collar 34 similar to the aforesaid collar 14. The other end 32' is formed with external screw threads 33' (slightly tapered inwards) for male connection. The outside of the body 31 has a hexagonal shape to facilitate turning by a spanner.

FIG. 4 shows a fourth pipe fitting embodying the invention, which is in the form of an end cap 40 having a (hollow) body 41 and a single open end 42 for closing an end of a pipe. The end 42 is formed with internal screw threads 43 and includes an integral extension collar 44 for performing the same function as the aforesaid collar 14. The body 41 has external ribs to facilitate turning.

The pipe fitting according to the present invention can protect the base material adjacent to the joints from being exposed so as to prevent the material from rusting and give a tidier appearance.

The invention has been given by way of example only, and various modifications of and/or alterations to the described embodiments may be made by persons skilled in the art without departing from the scope of the invention as specified in the appended claims.

What is claimed is:

1. A pipe fitting comprising a hollow body and at least one open end for connection to a pipe, the open end including
   an internally threaded portion having a wall with a thickness between internal and external diameters of the internally threaded portion, and internal screw threads for connection to a pipe, and
   an integral extension collar adjacent the internally threaded portion, having an inner diameter larger than the internal diameter of the internally threaded portion, for surrounding unused trailing screw threads of a pipe connected to the pipe fitting and forming an annular gap with a pipe connected to the fitting for holding a sealing compound, wherein the extension collar has a wall thickness substantially equal to the wall thickness of the internally threaded portion, and an outer diameter larger than the outer diameter of the internally threaded portion.

2. The pipe fitting as claimed in claim 1, wherein the internal screw threads are tapered outwards with respect to an axis of the open end.

3. The pipe fitting as claimed in claim 1, made of a galvanized iron material.

4. The pipe fitting as claimed in claim 1, wherein the fitting is selected from the group consisting of an elbow joint, a T joint, a straight joint, and an end cap.

5. The pipe fitting as claimed in claim 2, made of a galvanised iron material.

6. The pipe fitting as claimed in claim 2, wherein the fitting is selected from the group consisting of an elbow joint, a T joint, a straight joint, and an end cap.

* * * * *